(12) United States Patent
Schmitt et al.

(10) Patent No.: US 11,815,203 B2
(45) Date of Patent: Nov. 14, 2023

(54) DEVICE FOR GAS-TIGHT CONNECTION BETWEEN A CONNECTION SURFACE AND A REFERENCE SURFACE

(71) Applicant: ABB Schweiz AG, Baden (CH)

(72) Inventors: Johannes Schmitt, Friedrichsdorf (DE); Matthias Guth, Eschborn (DE); Stefan Bleil, Bad Homburg (DE); Gary Hachadorian, Frankfurt am Main (DE)

(73) Assignee: ABB Schweiz AG, Baden (CH)

( * ) Notice: Subject to any disclaimer, the term of this patent is extended or adjusted under 35 U.S.C. 154(b) by 202 days.

(21) Appl. No.: 17/371,136

(22) Filed: Jul. 9, 2021

(65) Prior Publication Data

US 2021/0332922 A1    Oct. 28, 2021

Related U.S. Application Data

(63) Continuation of application No. PCT/EP2020/050163, filed on Jan. 7, 2020.

(30) Foreign Application Priority Data

Jan. 9, 2019  (DE) .................... 10 2019 100 443.8

(51) Int. Cl.
  *F16L 27/06*    (2006.01)
  *F16L 27/053*   (2006.01)

(52) U.S. Cl.
  CPC ............. *F16L 27/053* (2013.01); *F16L 27/06* (2013.01)

(58) Field of Classification Search
  CPC ....... F16L 27/053; F16L 23/02; F16L 23/003; F16L 27/06
  See application file for complete search history.

(56) References Cited

U.S. PATENT DOCUMENTS 592,681 A * 10/1897 Barnhart ............... F16L 27/053
                                           285/918
826,454 A *  7/1906 Timmer ................ F16L 27/053
                                           285/94
(Continued)

FOREIGN PATENT DOCUMENTS

DE    7015738 U    8/1970
DE    8227235 U1   1/1983
(Continued)

*Primary Examiner* — Zachary T Dragicevich
*Assistant Examiner* — James A Linford
(74) *Attorney, Agent, or Firm* — Leydig, Voit & Mayer, Ltd.

(57) ABSTRACT

A device for gas-tight connection includes: a first connection point with a terminal surface; a second connection point with a stationary, predetermined reference surface of a pipe flange connection, which is arranged relative to the terminal surface by an offset angle which is compensated for by an angular offset compensation; and a flanged disc unit. The first connection point includes a central ball-and-socket joint arrangement as an angular misalignment compensation. The central ball-and-socket joint arrangement has a tube section with a convex distal end region configured to interact in an articulated manner with a concave annular region, corresponding thereto, of the flanged disc unit. A side surface region of the flanged disc unit includes at least one adjusting screw for adapting to the offset angle so as to adjust a local distance to a counter-disc fixedly fastened coaxially to a pipe section adjacent to the convex distal end region.

7 Claims, 2 Drawing Sheets

(56) References Cited

U.S. PATENT DOCUMENTS

| | | | | |
|---|---|---|---|---|
| 1,202,502 | A | * | 10/1916 | Forth .................... F16L 27/053 285/368 |
| 1,733,457 | A | * | 10/1929 | Hannahs ............... F16L 27/053 285/271 |
| 4,647,084 | A | | 3/1987 | Drewitz |
| 5,530,547 | A | * | 6/1996 | Arnold ................... G01M 11/04 356/508 |
| 7,490,868 | B2 | | 2/2009 | Prestridge |
| 9,116,259 | B2 | * | 8/2015 | Zhu .......................... G02B 7/00 |
| 2003/0035229 | A1 | * | 2/2003 | Willis .................... G02B 7/004 359/819 |
| 2011/0102893 | A1 | * | 5/2011 | Solyar .................... G02B 7/004 359/503 |
| 2014/0110934 | A1 | | 4/2014 | Berkness et al. |

FOREIGN PATENT DOCUMENTS

| | | |
|---|---|---|
| DE | 3508732 A1 | 9/1986 |
| DE | 19911814 A1 | 9/2000 |
| DE | 102006034323 A1 | 1/2008 |
| DE | 202012011622 U1 | 1/2013 |
| DE | 102012016843 A1 | 2/2014 |
| EP | 1399688 A1 | 3/2004 |
| EP | 2708659 A2 | 3/2014 |
| WO | WO 2009121512 A1 | 10/2009 |
| WO | WO 2014066240 A1 | 5/2014 |

* cited by examiner

DEVICE FOR GAS-TIGHT CONNECTION BETWEEN A CONNECTION SURFACE AND A REFERENCE SURFACE

CROSS-REFERENCE TO PRIOR APPLICATIONS

This application is a continuation of International Patent Application No. PCT/EP2020/050163, filed on Jan. 7, 2020, which claims priority to German Patent Application No. DE 10 2019 100 443.8, filed on Jan. 9, 2019. The entire disclosure of both applications is hereby incorporated by reference herein.

FIELD

The invention relates to a device for gas-tight connection between a connection or terminal surface and a reference surface.

SUMMARY

In an embodiment, the present invention provides a device for gas-tight connection, comprising: a first connection point with a terminal surface; a second connection point with a stationary, predetermined reference surface of a pipe flange connection, which is arranged relative to the terminal surface by an offset angle which is configured to be compensated for by angular offset compensation means; and a flanged disc unit, wherein the first connection point comprises a central ball-and-socket joint arrangement as angular misalignment compensation means, wherein the central ball-and-socket joint arrangement has a tube section with a convex distal end region configured to interact in an articulated manner with a concave annular region, corresponding thereto, of the flanged disc unit, and wherein a side surface region of the flanged disc unit includes at least one adjusting screw configured to adapt to the offset angle so as to adjust a local distance to a counter-disc fixedly fastened coaxially to a pipe section adjacent to the convex distal end region.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention provides for the connection of two vessels whose terminal surfaces are not aligned with each other and which—for example for structural reasons—cannot be aligned with each other. As a result, the geometric normals of the corresponding surfaces deviate from each other, resulting in an angular misalignment a. Such an angular offset a is contrary to the gas-tight connection of the two vessels.

In principle, it is known to provide an elastomeric O-ring between the corresponding connecting surfaces as an angular misalignment compensation means and to connect the corresponding connecting surfaces to each other in a force-fit manner. In addition, adjustable spacers (set screws) can be provided to limit the mechanical stresses between the corresponding connecting surfaces and the respective vessels. The disadvantage here is the asymmetrical load on the sealing element, which can lead to leaks and/or destruction of the sealing element, as well as the time-consuming adjustment of the spacers.

From DE 10 2006 034 323 A1 a movable pipeline is known which has connecting surfaces between its a corrugated tube arrangement as angular misalignment compensation means. The disclosure is aware of the basic suitability of such corrugated tube arrangements for compensating axial distance changes between the connecting surfaces, relative movements of the connecting surfaces transverse to the longitudinal direction of the corrugated tube and wobbling movements of the connecting surfaces.

DE 10 2012 016 843 A1 describes an adjustable flange for a tower of a wind turbine. Here, to compensate for angular deviations between a foundation flange and a tower flange, two identical, annular elements are provided whose end faces are each inclined to each other. Due to the large number of sealing surfaces, such an arrangement is unsuitable for gas-tight connections.

Finally, an expansion joint for a fluid conduit is known from DE 20 2012 011 622 U1, wherein a first pipe segment has a first joint surface and a second pipe segment has a second joint surface, the first and second joint surfaces being shaped as spherical regions. The first and second tube segments are connected by a corrugated tube that seals the articulated joint from the atmosphere. A disadvantage of this arrangement is its overall length.

It is the object of the invention to provide a device for gas-tight connection between a terminal surface and a reference surface of short overall length, in which the sealing function is separate from the alignment function.

The invention is based on a device for gas-tight connection of a first connection point to a terminal surface and a second connection point to a stationary, predetermined reference surface of a pipe flange connection, which is arranged relative to the said terminal surface by an offset angle α which can be compensated for by angular offset compensation means.

Figure 1:
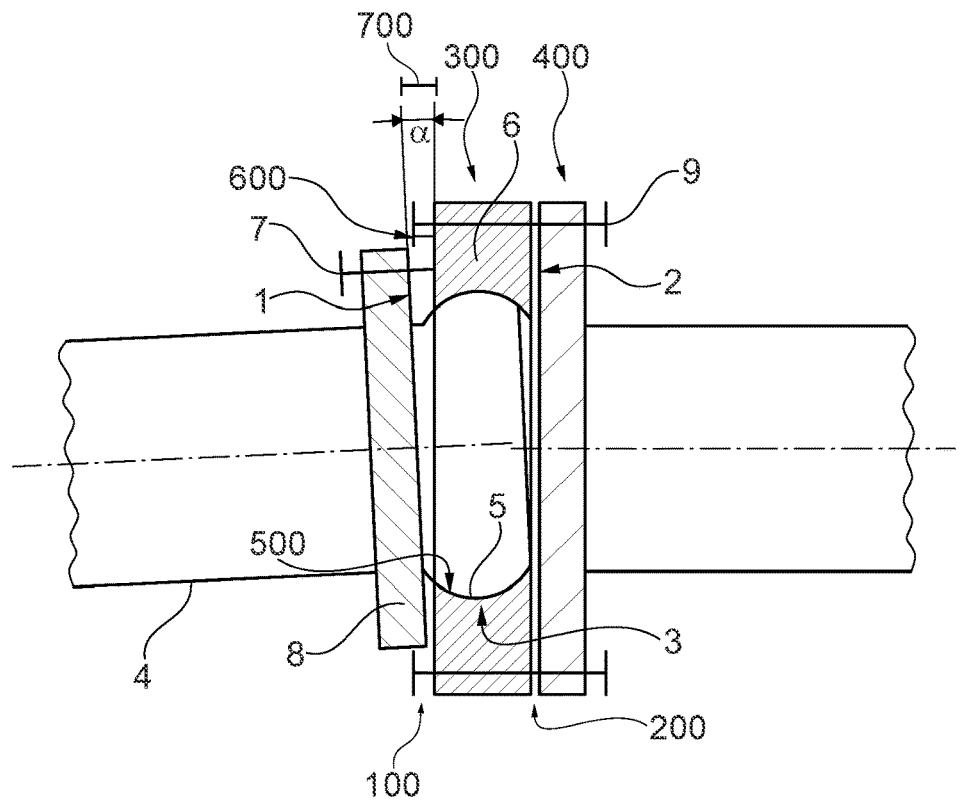
FIG. 1 a schematic longitudinal section through a pipe flange connection with angular misalignment compensation means, FIG. 2 a top view of the angular offset compensation means of the first connection point, FIG. 3 a longitudinal section through the first connection point of the pipe flange connection with the angular misalignment compensation means integrated therein in section A-A of FIG. 2, and FIG. 4 a longitudinal section through the first connection point of the pipe flange connection with the angular misalignment compensation means integrated therein in section E-E of FIG. 2.

According to the invention, the first connection point comprises a ball-and-socket joint arrangement as angular offset compensation means, which has a tube section with a convex distal end region that interacts in an articulated manner with a concave ring region of the flanged disc unit corresponding thereto, on the side surface region 600 as shown in FIG. 1 of which at least one set screw engages for adaptation to the offset angle α, by means of which the local distance to a counter-disc fixed coaxially on the tube section adjacent to the convex distal end region can be adjusted.

In other words, the first connection point has an annular section with a convex surface in the form of a spherical layer at its distal end. In addition, the first connection point comprises at its distal end a flanged disk unit which has a recess in the form of a spherical layer with a concave surface and whose distal surface is designed to correspond to the fixed, predetermined reference surface of the second connection point. The radius of the convex surface of the first connection point is equal to the radius of the concave surface of the recess of the connection element. The flanged disk unit is movably connected to the first connection point, wherein the concave surface of the recess of the flanged disk unit rests on the convex surface of the annular portion of the first connection point to form the ball joint arrangement.

Thanks to the design of the distal end region of the tube section in cooperation with the flanged disc unit as a ball-and-socket joint arrangement, an angular offset of tube axles to be connected to each other can be compensated in a simple manner. In this case, the angular adjustment is made by means of at least one, preferably two, set screws, which adjust the required inclination of the flanged disc unit relative to the mating disc fixed stationarily to the pipe section to be attached. In principle, these angular misalignment compensation means 400 as shown in FIG. 1 separate the alignment function of the pipe flange connection from the sealing function, which is ensured by full-surface contact between two flange surfaces to be connected. This allows faster and more intuitive alignment of a pipe flange joint that is under angular misalignment. Since the seal is ensured via the ball joint arrangement at the distal end area of the pipe section, a permanent seal can be achieved even at larger offset angles.

For cooperation with the convex distal end region of the tube section, the flanged disc unit is preferably formed from two disc parts that come into contact with each other over their entire surface and together form the concave ring region on the inner radial side. This division into two parts allows the flanged disc unit to be mounted on the distal end region of the tube section. Both disk parts can be screwed or welded together, for example. One disk part of the flange disk unit is preferably designed as a flange disk having several through holes in order to realize the attachment to a mating flange of the pipe flange connection having the reference surface. The other disk part, on the other hand, can be smaller in basic diameter and preferably has recesses around the outside as clearances for the through-holes.

According to a preferred embodiment of the flanged disc unit, it is provided that at least one spherical recess is formed between the two disc parts, which together with a ball head of the associated set screw forms an associated ball joint. In this context, a spherical recess is understood to be a concave spherical layer introduced on the part of one washer part or both washer parts, which together with the ball head forms the ball joint that allows the set screw to be pivoted—depending on the offset angle $\alpha$. It is sufficient if the ball head of the set screw has at least a convex surface shape of a corresponding spherical layer.

According to a preferred embodiment of the angular displacement compensation means according to the invention, the at least one set screw comprising the latter has an external thread which cooperates with an internal thread formed in the stationary counter-disk in such a way that an adjustment to the angular displacement a can be made by screwing the set screw in or out.

Quite preferably, exactly two set screws are provided, each with an associated ball joint, which are arranged on two swivel axes X and Y of the flanged disc unit, which run orthogonally to each other. This allows any spatial offset angle $\alpha$ to be compensated for by actuating the two adjusting screws.

According to a measure further improving the invention, it is proposed that the at least one set screw of the angular displacement compensation means can be locked by a fixing screw screwed transversely thereto into the edge region of the stationary counter-disk. This can prevent unintentional adjustment of the set screw, for example as a result of vibration.

In order to provide the angular displacement compensation means according to the invention with an improved static seal in the region of the ball-and-socket joint arrangement of the first connection point, it is proposed to arrange at least one elastomeric sealing ring in the overlap region between the convex distal end region of the tube section and the concave ring region of the flanged disc unit corresponding thereto. The sealing ring can be designed, for example, as an O-ring which is inserted in a circumferential groove on the part of the tube section or the flanged disc unit.

According to another measure improving the invention, it is also proposed that at least one stop pin or the like is arranged between the convex distal end region of the tube section and the corresponding concave annular region of the flanged disc unit for limiting the swivel range adjustable by the set screw to compensate for the offset angle $\alpha$. Such a stop pin can, for example, be screwed into the convex distal end region of the tube section, namely on the side of the tube section opposite the associated set screw.

According to a preferred application variant, the angular offset compensation means according to the invention are used on a pipe flange connection of an optical measuring device for liquids or gases, in particular an optical gas concentration measuring device, in order to connect it to a measuring medium.

According to FIG. 1, the device for gas-tight connection of a first connection point 100 to a terminal surface 1 and a second connection point 200 to a reference surface 2 of a pipe flange connection has angular offset compensation means 300 arranged on the side of the first connection point 100 to compensate for an offset angle $\alpha$ between the first connection surface and the reference surface 2. For this purpose, the first connection point 100 comprises a ball joint arrangement 3, which has a pipe section 4 with a convex distal end region 5. The distal end region 5, which interacts in an articulated manner with a concave annular region 500 of a flanged disc unit 6 corresponding thereto, can be adjusted with regard to the offset angle $\alpha$ by means of at least one adjusting screw 7. For this purpose, the local distance 700 to a counter-disc 8 fixed coaxially on the tube section 4 adjacent to the convex distal end region 5 is adjustable. The counter-disk 8 runs orthogonally to the pipe axis of the pipe section 4. A fastening of the first connection point 100 with the second connection point 200 is realized via a screw connection 9 (exemplary) in the sense of a flange connection.

Figure 2:
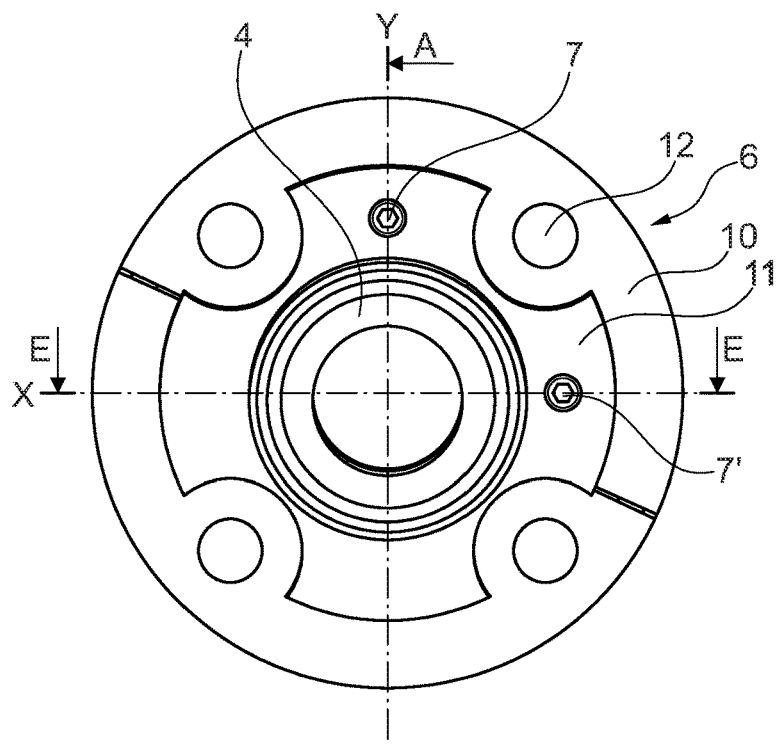

According to FIG. 2, the flanged disk unit 6 consists of two disk parts 10 and 11 that come into contact with each other in a planar manner. One disk part 10 of the flanged disk unit 6 has several through holes 12 (exemplary) for receiving the screw connection 9. Compensation of the offset angle $\alpha$ is effected by actuation of two adjusting screws 7 and 7', which are arranged on two pivot axes X and Y, respectively, extending orthogonally to each other. Adjustment of adjusting screw 7 causes the flanged disc unit 6 to swivel about swivel axis X, whereas adjustment of the other adjusting screw 7' causes the flanged disc unit 6 to swivel about the other swivel axis Y. By means of differently selectable positions of the two adjusting screws 7 and 7', any spatially conceivable offset angle $\alpha$ can be set in a defined swivel range.

Figure 3:
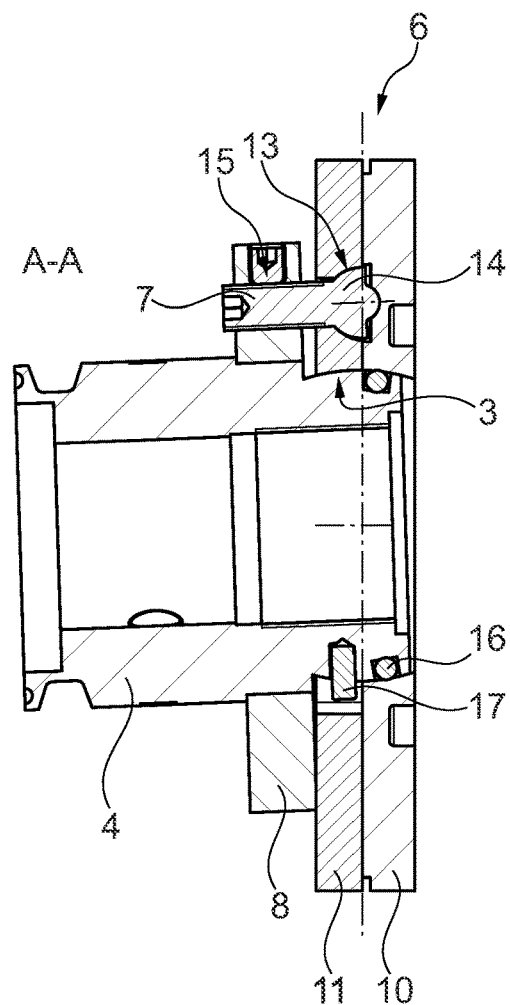

FIG. 3 illustrates the effect of adjusting the adjusting screw 7 in section A-A of FIG. 2 discussed above. A pivotability of this plane is made possible via the central ball joint arrangement 3. In order to give the adjusting screw 7 the freedom of movement required for its creation, an associated spherical recess 13 is formed between the two letter parts 10 and 11 of the flanged disc unit 6. This spherical recess 13 interacts with a spherical head 14 of the adjusting screw 7 to form a ball joint. The external thread of the adjusting screw 7 engages in an internal thread corresponding thereto, which is introduced into the stationary counter-disc 6 mounted orthogonally on the tube section 4, by means of which an adjustment to the offset angle α about the swivel axis X can be made.

The adjusting screw 7 can be locked by a fixing screw 15 which can be screwed transversely thereto into the edge region of the stationary counter-disc 6. In the area of the central ball-and-socket joint arrangement 3, an elastomeric sealing ring 16 is also inserted to seal the gap between the tube section 4 and the flanged disc unit 6 movably arranged thereon. Furthermore, in the area of the central ball joint arrangement 3, a stop pin 17 is screwed into the convex distal end area 5 of the tube section 4 in order to limit the swivel range adjustable by the adjusting screw 7 for compensating the offset angle α.

Figure 4:
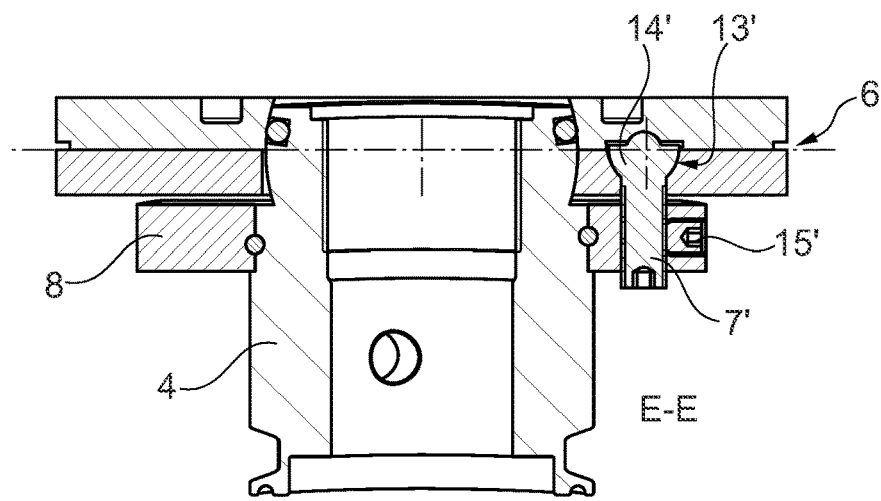

FIG. 4 illustrates, in section E-E from FIG. 2, the angular offset compensation means 300 for pivoting the flanged disk unit 6 about the other pivot axis Y. For this purpose, the other adjusting screw 7' is screwed in or out. The mode of operation here is similar to that described in connection with FIG. 3 discussed above. Corresponding components are marked with analogous reference signs.

The invention is not limited to the preferred embodiment described above. Rather, variations thereof are also conceivable, which are included in the scope of protection of the following claims. For example, it is not necessary that an adjustment to the offset angle α has to be made with respect to two pivot axes extending orthogonally to each other. Depending on the application, it may be sufficient that an adjustment of only one swivel axis is sufficient to compensate for the misalignment angle α between a connection surface and a reference surface of a pipe flange connection.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 1 connection or terminal surface
2 reference surface
3 joint arrangement
4 tube section
5 distal end region
6 flanged disk unit
7 adjusting screw
8 counter disk
9 screw connection
10 first disk part
11 second disk part
13 spherical recess
14 spherical head
15 fixing screw
16 sealing ring
17 stop pin
α offset angle

What is claimed is:

1. A device for gas-tight connection, comprising:
a first connection point with a terminal surface;
a second connection point with a stationary, predetermined reference surface of a pipe flange connection, which is arranged relative to the terminal surface by an offset angle which is configured to be compensated for by angular offset compensation means; and
a flanged disc unit,
wherein the first connection point comprises a central ball-and-socket joint arrangement as angular misalignment compensation means,
wherein the central ball-and-socket joint arrangement comprises a tube section with a convex distal end region configured to interact in an articulated manner with a concave annular region, corresponding thereto, of the flanged disc unit, and
wherein a side surface region of the flanged disc unit comprises at least one adjusting screw configured to adapt to the offset angle so as to adjust a local distance to a counter-disc fixedly fastened coaxially to a pipe section adjacent to the convex distal end region, and
wherein the flanged disc unit comprises two disc parts that come into contact with one another in a planar manner and together form the concave annular region on an inner radial side, and
wherein at least one spherical recess is formed between the two disc parts of the flanged disc unit, which recess, together with a spherical head of an associated at least one adjusting screw, forms an associated peripheral ball joint.

2. The device of claim 1, wherein a disc part of the flanged disc unit comprises a flange disc having a plurality of through holes.

3. The device of claim 1, wherein an external thread of the at least one adjusting screw cooperates with an internal thread formed in the counter-disc such so as to enable an adjustment to the offset angle.

4. The device of claim 1, wherein exactly two adjusting screws are provided, each with an associated peripheral ball joint, which are arranged on two mutually orthogonal pivot axes of the flanged disc unit.

5. The device of claim 1, wherein the at least one adjusting screw is lockable by a fixing screw screwed transversely thereto into an edge region of the counter-disc.

6. The device of claim 1, further comprising:
at least one elastomeric sealing ring arranged in an overlap region between the convex distal end region of the tube section and the concave annular region, corresponding thereto, of the flanged disc unit.

7. The device of claim 1, further comprising:
at least one stop pin arranged between the convex distal end region of the tube section and the concave annular region, corresponding thereto, of the flanged disc unit so as to limit a swivel range,
wherein the swivel range is adjustable by the at least one adjusting screw to compensate the offset angle.

* * * * *